United States Patent [19]
Fryer et al.

[11] Patent Number: 5,125,874
[45] Date of Patent: Jun. 30, 1992

[54] LONG LIFE MODULAR LINK BELTS SUITABLE FOR ABRASIVE ENVIRONMENTS

[75] Inventors: Joseph A. Fryer, Jefferson; Christopher G. Greve, Covington, both of La.

[73] Assignee: The Laitram Corporation, New Orleans, La.

[21] Appl. No.: 643,265

[22] Filed: Jan. 22, 1991

[51] Int. Cl.⁵ ............................................. F16G 13/04
[52] U.S. Cl. ..................................... 474/214; 474/207
[58] Field of Search .................. 474/206, 207, 213, 1, 474/217; 198/850, 851

[56] References Cited

U.S. PATENT DOCUMENTS

| | | | |
|---|---|---|---|
| 728,390 | 5/1903 | Graham | 198/851 |
| 1,004,389 | 9/1911 | Dodge | 474/213 |
| 1,094,200 | 4/1914 | Dodge | 474/213 |
| 2,266,688 | 12/1941 | Keller | 474/214 |
| 2,987,332 | 6/1961 | Bonmartini | 474/207 |
| 3,344,907 | 10/1967 | Van Valkenburgh | 198/851 |
| 3,503,579 | 3/1970 | Kurlandsky | 474/206 |
| 4,140,025 | 2/1979 | Lapeyre | 474/207 |
| 4,625,507 | 12/1986 | Moritz | 474/207 |

FOREIGN PATENT DOCUMENTS

312812 2/1918 Fed. Rep. of Germany ...... 198/851

Primary Examiner—Renee S. Luebke
Assistant Examiner—F. Saether
Attorney, Agent, or Firm—Laurence R. Brown; James T. Cronvich

[57] ABSTRACT

Improved articulation structure is provided for pivoting links of a modular belt, namely a hinge strip of flexible material such as a thermoplastic elastomer and mating receptacle aperture slots in link ends. The modular links are all alike with flared ends in the slots permitting the hinge strip to flex a limited angle without frictional rubbing with the links. The slots have limited constant widths facing outwardly to prevent movement of the hinge strip in a direction perpendicular to the surface of the belt. Staggered end fingers of the links are half the thickness of a central body portion which provides a smooth top surface without apertures for interdigitation with similar end to end links. This construction is particularly useful for operation in abrasive conditions where wear on conventional pivot pins would significantly reduce belt life.

15 Claims, 2 Drawing Sheets

LONG LIFE MODULAR LINK BELTS SUITABLE FOR ABRASIVE ENVIRONMENTS

TECHNICAL FIELD

This invention relates to modular link belts and more particularly it relates to plastic conveyor belts providing long operation life in an abrasive environment.

BACKGROUND ART

When conveyor belts are required to operate in non-environmentally controlled conditions where they are subjected to abrasives, their life span is considerably shortened by frictional contact between relatively movable parts in the presence of the abrasives. Even in the absence of grit and other abrasives, belt wear in the vicinity of relatively movable parts is the most significant factor in terminating the useful life span of the belt.

In modular link conveyor belts, modular links are traditionally interdigitated at opposite ends and linked together by means of pivot pins extending through the interlaced belt end fingers in a pattern forming a conveyor surface. The links need to have articulated joints for passing over sprockets, for example, conventionally provided by means of the pivot pins.

These pivot pins have provided many problems in construction and operation. If they are rigidly mated in tight fitting mating apertures, there is little room for thermal expansion for example which can change dimensions enough to introduce greater wear, binding or inability to flex when under load or impact conditions. If the pivot pins are slidable or loosely fitted, they induce significant frictional wear particularly in abrasive environments where grit can accumulate in the vicinity of the pivot pin bearings. Because of forces acting upon the pivot pins they may be forced axially out of position with loading or torsion conditions in the belt. This requires countermeasures such as riveted heads on the pivot pins, snap catches, and the like. With conventional cylindrical pivot pins, the articulation wear when the belt goes around sprockets, etc., generally leads to belt failure. If the pins are replaceable, repairs may be made, but they are not always easily accessible for removal, since they must be retained in place securely during normal belt operation by heads or retaining structure so that they will not be moved out of position. The expense of pin construction with retention heads and corresponding link means specially provided to hold the pivot pins in place is objectionable as well as the assembly costs because there are many links connected together in a belt.

A major problem encountered is the accumulation of dirt and grit in the vicinity of the pivot pin wear surfaces, casing accelerated abrasive wear and early belt failure.

This frictional pivot pin wear has to some extent been eliminated by the provision of a flexible strip forming a so-called "living hinge" replacing the conventional pivot pin in J. M. Lapeyre U.S. Pat. No. 4,140,025; Feb. 20, 1979 entitled Link Chain Having Non-frictional Couplings. Therein, the flexible strips replacing pivot pins are secured to the interdigited links so that the flexible web forms articulation means at a hinging joint that does not frictionally slide over link surfaces or require journalling in a bearing surface.

This prior art belt worked well under light load conditions and for some applications. However, for universal adaptability to a range of operation conditions, that belt system presented a different set of unsolved problems. For example, the material being hinged could be buckled under high belt tension loads. The hinging effect also eventually causes catastrophic life ending fatigue in the fabric material requiring complicated maintenance procedures. Failure is particularly induced under heavy belt loads causing tension in the fabric as the joined links pull apart from each other, leaving the fabric to bear the belt tension load. This reduced the belt load bearing capacity. Furthermore, the accompanying belt array presented other operational limitations, such as the inability to produce a flat substantially unapertured belt conveyance surface, a belt surface that resists torsion caused by load objects, and smooth continuous belt edges that can ride upon an adjoining guide rail.

Accordingly, it is an objective of this invention to provide improved conveyor belts and accompanying articulation means resolving the foregoing disadvantages of both conventional pivot pin connected link belts and those employing substantially frictionless living hinge articulation means.

DISCLOSURE OF THE INVENTION

There is provided by this invention a long life modular link conveyor belt operable in abrasive environments to carry heavy loads on substantially flat surfaces that are not easily twisted by torsion forces caused for example by unbalanced loading. It has further advantages of low cost production with identical universal plastic links coupled together with easily manipulated rectangular cross section thermoplastic elastomer linking pins, simple replacement of the linking pins when required and others that will appear throughout the following description.

Accordingly flat topped modular plastic links interdigited in a belt present a substantially continuous apertureless flat belt edge surface. By socketing the links together across the belt width to form in essence a single unit, distortions of the belt configuration by torsion forces is substantially eliminated.

A living hinge articulation joint provides all the advantages of long life without frictional wear and produces superior performance in abrasive environments. The living hinge is employed in a compression mode of operation to increase the belt loading capacity and performance under tension. The hinge pins are simple strips of substantially rectangular cross sectioned flexible plastic material, which is low in cost, easy to manufacture and easy to insert and remove.

The hinge rod is not attached to the links but is rather introduced into retaining slits in the interdigited module end fingers without attachment or restraint other than that provided by the matrixing slit dimensions. The belt loading tension forces compress the hinge rod so that it performs well with high belt loads.

Thus, this invention provides the unexpected combination of superior functional belt performance at lower construction and maintenance cost than heretofore feasible, as will become more apparent from reference to the following description, drawing and claims.

BRIEF DESCRIPTION OF THE DRAWINGS

Like reference characters identify related features throughout the various views in the accompanying drawing, wherein.

THE PREFERRED EMBODIMENTS

Figure 1:
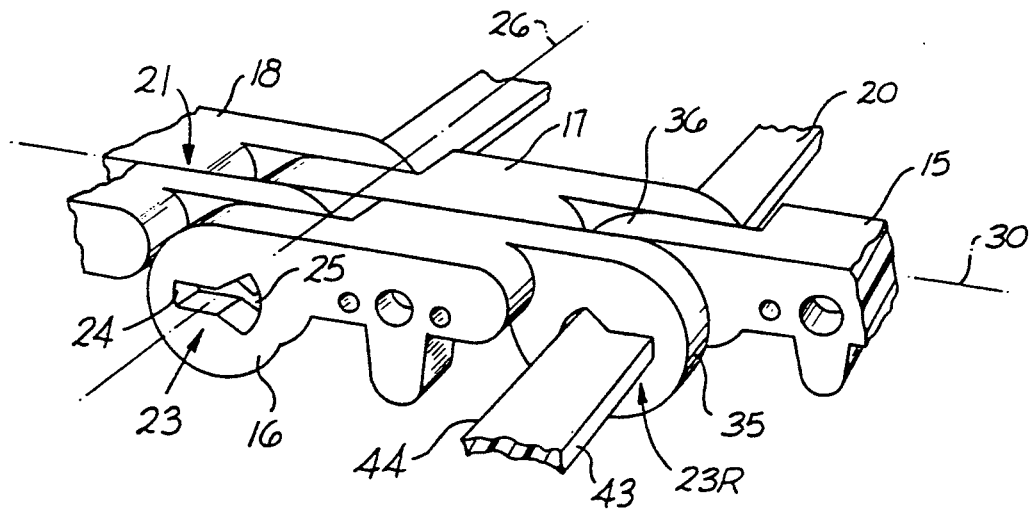
FIG. 1 is a fragmental perspective view of conveyor belt embodying the invention.

As may be seen from FIG. 1 the modular links 15, preferably of plastic, are coupled together side-by-side 16, 17 and end-to-end 18, 19 by means of plastic flexible hinging strips 20, substantially rectangular in cross section. The modular links 15 are flat topped to provide a continuous substantially flat conveyor belt surface 21 without apertures. Such belts have advantages for conveying special products, small items and irregularly shaped items. It is seen from FIG. 2 that also the belt edge provides a substantially flat continuous surface which is advantageous whenever the belt must ride against a guide rail.

In articulation, the hinge strips, bars, rods or pins 20 are flexed, substantially at mid point in the longer rectangular dimension, as required in the hinging joints as the belt passes over a sprocket 22, for example. Both ends of the links have apertured flared slots 23 with substantially half of the slot length providing a rectangular matrix receptacle end 24 closely fitting the hinge strip dimensions. The flared slot 25 end portion extends from mid-slot at the usual pivot axis 26 toward the center of the link, and provides a cavity for flexing of the strip in its living hinge action in opposite directions over a restricted angle or arc which prevents the hinging to exceed the working stresses for the particular material being deformed. The hinge bar 20 is thus freely movable along the hinging axis for insertion or removal and is retained in position axially simply by the friction imposed by the snug fit into the rectangular matrix portion 24 of the slot. Such a hinging rod has little tendency to move axially under normal belt operations.

Figure 5:
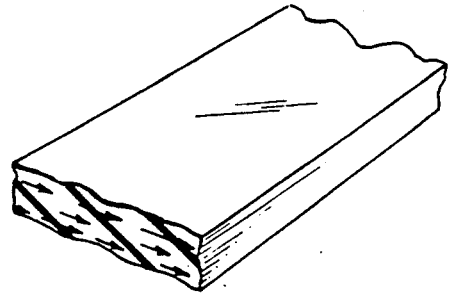
FIG. 5 is a perspective fragment of a hinge pin afforded by this invention sectioned to show a preferred grain orientation.

The hinge bar material, typically a thermoplastic elastomer, has a stiffness and compressibility for coupling the links together while bearing the tension load on the belt. Extrusion of plastic hinge pins orients the grain structure of the material in the direction of the pivot axis 26. Plastic hinge pins having a narrowed flexing portion are susceptible to separating or shredding along the grain (axially) with flexure. Orienting the grain along the axis of belt travel requires exceptional manufacturing considerations, extrusion being the normal method of manufacture. The rectangular shape additionally therefore is advantageous since the hinge strips 20, having no narrowed, flexing portion susceptible to shredding, may be extruded. Alternatively, the hinge strips may be cut from a sheet extruded to give the grain orientation shown by the arrows in FIG. 5.

Figure 2:
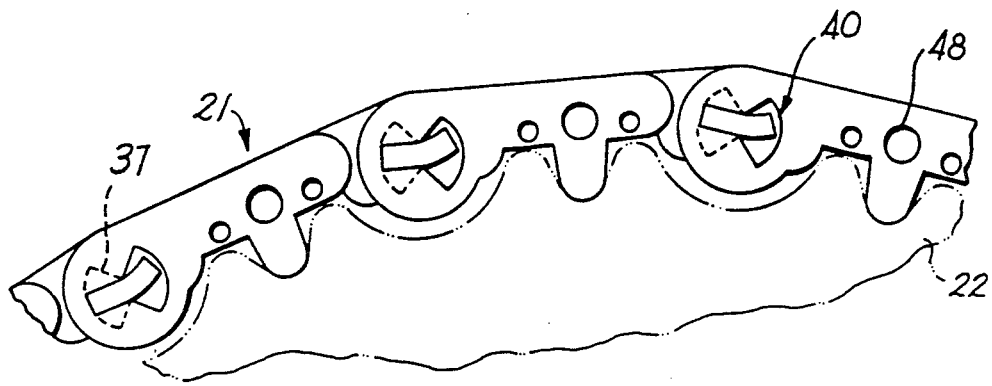
FIG. 2 is a fragmental side view of a belt articulated at joints disposed about a sprocket.

The side-by-side interdigited link fingers 36, are oriented with the rectangular slot ends 24 pointed outwardly from the link, thus causing the flared ends in side-by-side links to be alternately directed, as shown in phantom view 37 in the end view sketch of FIG. 2. Elasticity in the hinge material permits the hinging in the confined flared cavity 25 with the link end fingers closely packed side-by-side. In this respect the clearance 40 provided by making the slot length longer than the hinge length along the belt axis 30 permits a limited degree of extension of the hinge strip 20 by elasticity and/or movement toward the flared end under belt loading tension.

The "compression" mode of operation of the hinging material is critical to the extension of life and the increased load bearing capacity of the living hinge feature. This is feasible by means of the orientation of the flared portions 25 of the slots 23 toward the center of the links 15. In this respect, consider the reactions encountered on the strip 20 from the fingers 35, 36 of the side by side links 15 and 16. The orientation of the slot in finger 35 with the rectangular portion to the right leads to the reference character 23R to identify that orientation as compared with 23 wherein the rectangular portion is pointed to the left. Finger 36 has the latter slot orientation, as seen better in FIG. 4.

As the belt is loaded, the (drive) sprocket 22 will exert tension in the belt along the drive axis 30. This will tend to move finger 36 to the right and finger 35 to the left. In other words the links tend to separate. It is desirable under such circumstances for the belt to have some play or give for best performance, but the magnitude of play must be limited. With the flexible, elastic, compressible material of hinge strip 20 therefore, the two fingers 35 and 36 may move apart as much as the compressibility-elasticity and or movement of the hinge rod permits. Consider then that finger 35 may indent the edge 43 and finger 36 may indent the edge 44 to bear the load. The snug fit of the hinge strip in the rectangular slot portion 24 will prevent buckling, as will the clearance 40. An eye view through aligned slots along pivot axes while not under going articulation about the sprocket reveals a rectangular through-slot roughly twice the length of each rectangular slot portion, the view of the complete shared cavities being occluded by neighboring link material surrounding the rectangular slot portions. The hinge material is thus confined to restrict hinge strip deflection in the direction perpendicular to the belt surface 21.

This edge indentation or compressibility will not cause frictional sliding and wear, so that the wear characteristic of the hinge strip material depends upon material fatigue, giving the strip long life characteristics. There is no tendency to stretch or rupture the hinge strip under load. The load bearing capacity of the hinge strip 20 may be increased by increasing the effective cross sectional area of the hinge strip 20.

Figure 3:
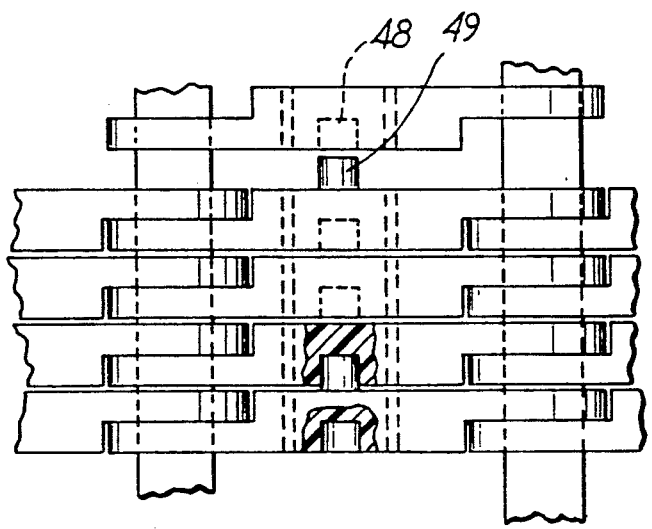
FIG. 3 is a fragmental top view, partly broken away and partly exploded, of a conveyer belt embodiment of the invention.

On the opposite sides of the links 15 are mating socket apertures 48 and plugs or pegs 49, which interfit as shown in FIG. 3. Since the hinge strip 20 is flexible in the direction perpendicular to the belt surface 21, the belt would be subjected to torsional forces and deformation of the belt surface characteristics, for example when unbalanced loads not equally distributed across the belt surface are encountered. It is seen then from FIG. 3 that the mating peg and socket structure will give the belt lateral stiffness across its width.

Figure 4:
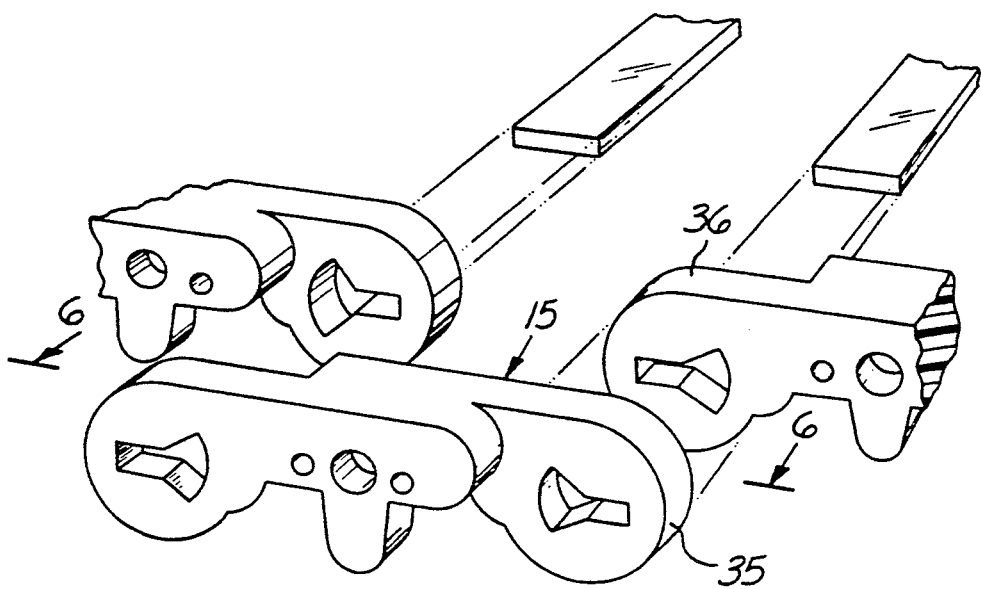
FIG. 4 is an exploded fragmental perspective view from a female socketed side of the modular links of a belt embodiment of the invention.
Figure 6:
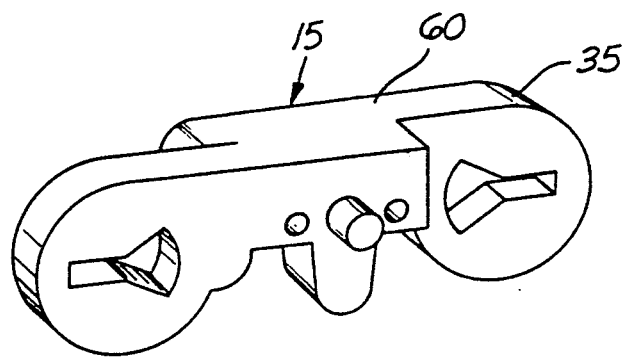
FIG. 6 is a perspective view from the male plug side of the modular links afforded by this invention.

The details of the links 15 and assembly relationship are exhibited in FIGS. 4 and 6. The apertured socket female side is seen in FIG. 4 and the peg male side is seen in FIG. 6. The flat upper surface 60 is shown. The central body portion has approximately twice the lateral thickness of the finger porions 35, 36, which are staggered on opposite ends so that the links can be closely spaced (FIG. 1) in interdigited relationship. It is evident therefore that a single link module 15 is universally used with a single hinge pin configuration 20 for the simplest and least costly manufacture and assembly. No intricate assembly techniques are involve so that the assembly of the belts can be easily mechanized.

Although the rectangular hinge bar has been shown in a specific embodiment of belt link modules forming an apertureless belt surface, one skilled in the art can appreciate that similar advantages provided by the hinge bar could be realized in many other modular belt configurations using such a rectangular hinge bar.

It is therefore evident that this invention has advanced the state of the art and therefore those novel features descriptive of the spirit and nature of this invention are set forth with particularity in the following claims.

We claim:

1. A belt formed of a plurality of modular links interconnected in a pattern of side by side links, comprising in combination,
 a plurality of link modules, each having two end portions with generally longitudinally oriented slots therein for receiving an articulation member, said slots having a predetermined length with a substantially rectangular portion extending from one end part way through its length and flaring outwardly therefrom to form a substantially sectorial shaped slot portion over substantially the rest of the slot length, and
 an articulation member comprising a hinge bar of substantially rectangular cross section of a width for registering in said substantially rectangular portion of the slots and of a length less than that of the length of said slots to permit movement of the hinge bar along the slot length, said hinge bar being of a flexible material compressible inwardly from the substantially rectangular end of the slots, having a bar length for extending through a plurality of said slots in side by side modules forming said belt, said hinge bar being freely movably disposed through a plurality of slots in side by side links as articulation means and residing in slots having the flared ends disposed in a direction permitting two adjacent end to end links to articulate by flexing the hinge bar within the flared portions of the slots.

2. The belt of claim 1 wherein said hinge bar material has a stiffness and compressibility for coupling the links together for bearing a tension load between end to end links coupled together to form said belt.

3. The belt of claim 1 wherein said links present a generally planar upper belt surface without through holes suitable for conveyance of objects of small size that could pass through holes in a belt surface.

4. The belt of claim 1 wherein said links comprise a central body portion of predetermined thickness, and said end portions have substantially half said thickness and extend in staggered relationship from different sides of the central body portion.

5. The belt of claim 4 wherein said central body portion has on opposite sides thereof mating peg and socket structure adapted to prevent relative longitudinal movement of elements in a row of side by side links.

6. The belt of claim 4 wherein said slots in the end portions have the rectangular portions extending in opposite directions.

7. The belt of claim 6 wherein said rectangular portions point outwardly from the link.

8. The belt of claim 4 wherein a plurality of side by side links along a length of the belt present a substantially planar side surface with rectangular portions of the slots alternatively pointing in opposite directions.

9. The belt of claim 1 wherein said hinge bar material is a thermoplastic elastomer.

10. The belt of claim 1 wherein said hinge bar material is grain oriented in a direction of belt movement.

11. The belt of claim 1 wherein said rectangular portion of the slot has a length substantially half the length of the slot.

12. The belt of claim 1 wherein said rectangular portion of the slot is substantially parallel to the direction of belt travel and is dimensioned to restrict hinge bar deflection in a direction perpendicular to a conveying surface of the belt.

13. The belt of claim 1 wherein said hinge bar is freely movable to and from in said slots in a direction lateral to a direction of belt movement.

14. The belt of claim 1 wherein said hinge bar is formed by extrusion along the long axis at said hinge bar.

15. Modular belt links for forming an articulatable belt with flexible strip hinge means coupling links end to end for pivotable movement, said links having longitudinally oriented slotted apertures at two ends of the links with substantially constant width over a portion of a slot length extending from one end for snugly receiving a mating hinge strip in a longitudinally movable unanchored relationship and flanging outwardly to provide a sector shaped receptacle compartment at the other end of the slot defining a limited hinging angle within which the strip hinge may be flexed, wherein the constant width portions at each end point outwardly from the links.

* * * * *